(No Model.)
W. F. BREWSTER.
FISH HOOK.
No. 395,480. Patented Jan. 1, 1889.
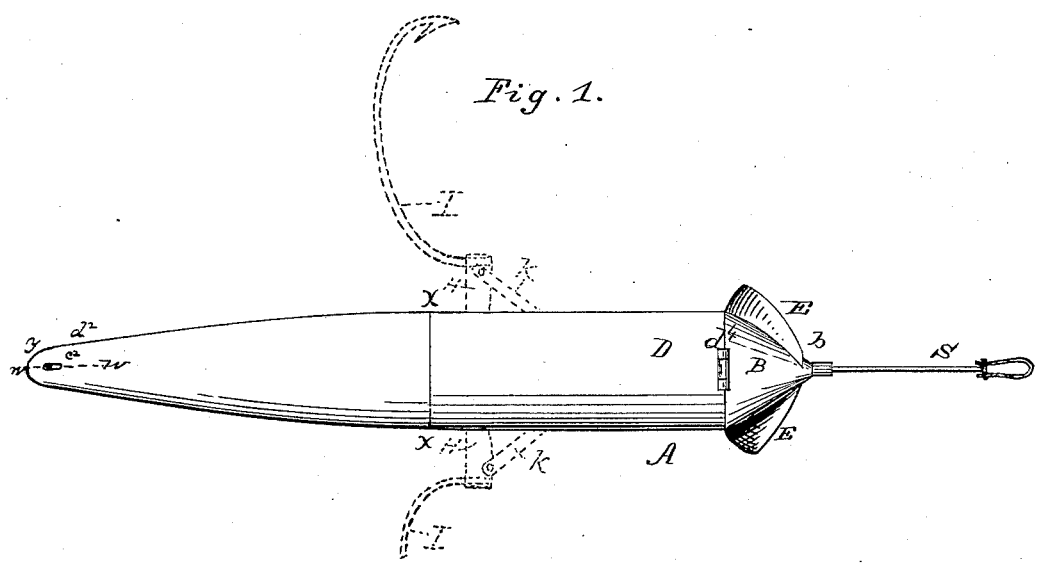
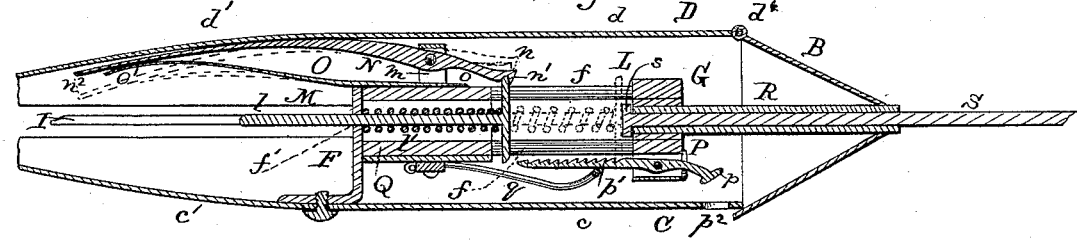
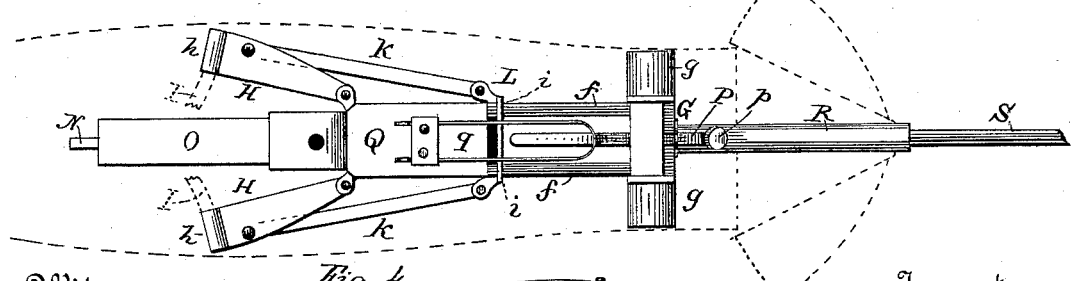
Witnesses.
William Goebel.
C. H. Dieterich.
Inventor.
William F. Brewster

United States Patent Office.

WILLIAM F. BREWSTER, OF EAST ORANGE, NEW JERSEY.

FISH-HOOK.

SPECIFICATION forming part of Letters Patent No. 395,480, dated January 1, 1889.

Application filed January 11, 1888. Serial No. 260,399. (No model.)

*To all whom it may concern:*

Be it known that I, WILLIAM F. BREWSTER, a citizen of the United States, residing at East Orange, in the county of Essex and State of New Jersey, have invented certain new and useful Improvements in Fish-Hooks, of which the following is a specification.

My invention relates to improvements in fish-hooks, especially to those which are used in trolling for trout, muskallonges, &c. Fish of these kinds frequent places where there is more or less grass, weeds, sedges, and other vegetable growth and obstructions. The ordinary hook or hooks used for catching such fish, whether with artificial or live bait, have the points of the hooks exposed, and are so constructed that when drawn through the water they are liable to become, and generally do become, entangled by the weeds and other obstructions with annoying frequency. Being thus caught or entangled not only causes annoyance, delay, and the frequent breaking of the hook or line, but experience has proved that even a small weed will prevent the fish from biting.

My invention provides a fish-hook which can be used in or trolled through the water without danger of becoming entangled or caught by weeds or other obstructions, and also at the same time be sensitive to the bite of the fish without danger of the hook or hooks being thrown from their inclosed position until the positive bite of the fish is given upon it.

One object of my invention is to provide a fish-hook with its hook or hooks so inclosed within a yielding inclosing-case that the fish-hook can be used in water containing vegetable growth and other obstructions without catching such growth or obstructions, and upon the positive bite of the fish being given upon the inclosing-case that said case will yield and cause the hook or hooks to be thrown outwardly in position for securing the fish.

Another object of my invention is to provide a fish-hook with its hook or hooks mounted in a case or support, and with means by which the hook or hooks are positively locked against being forced or moved backwardly to the position from which they were thrown upon the bite of the fish until such locking means are unlocked or released.

Another object of my invention is to provide a fish-hook with its hook or hooks inclosed within a yielding inclosing-case, and upon the positive bite of the fish being given upon the inclosing-case the said case will yield and cause the hook or hooks to be thrown outwardly in position for securing the fish, and be positively locked in such position against being thrown or forced backward again into the inclosing-case until such locking means are unlocked or released.

Another object of my invention is to provide a fish-hook with its hook or hooks inclosed within an inclosing-case, and means by which the hook or hooks are positively locked against being forced or moved backwardly into the inclosing-case at two or more points within the limits of the movement of the hook or hooks.

The invention consists of the fish-hook herein described and claimed.

In the annexed drawings, Figure 1 is a view of the device, looking down on the closed lid. Fig. 2 is a longitudinal section taken vertically through the middle of the lid. Fig. 3 is a plan view of the interior and mechanism, looking from the side opposite to the lid. Fig. 4 shows the inclosing-case in the form of a fish, being another form of artificial bait.

The letter A indicates an inclosing-case made yielding, and consisting of a conoidal head, B, to which is secured rigidly a body, C, and to which head is hinged at $d^4$ a lid, D. The body C and lid D are about the same shape and size. To about the point $x\ x$ they are semi-cylindrical, and from that point to the tip $y$ they are semi-conoidal, the parts being indicated by letters $c\ d\ c'\ d'$. The tip end of the lid D has a small slot, $c^2$, which engages a headed pin, $d^2$, upon the inside of the tip end of the body C, the resiliency of the lid being sufficient to hold the lid on the pin. This construction of inclosing-case renders it yielding, so that upon a fish seizing it the case readily yields so as to be capable of acting to release a detent. On the outside of the head B, at the ends of a given diameter, are two propeller-blades, E E, running from the point $b$ of the cone backward with the due curve.

Secured to and rising from the inside of the body C is a bracket, F, to which are fastened four rods, $f\ f\ f\ f$, which extend from this bracket toward the head B, and are fastened to a stationary cross-head, G, which is held to the body C by screws passing through the body and entering arms g g of said cross-head, forming a frame or support. To each side of the bracket F is movably mounted an arm, H, having at its outer end an eye, h, into which a hook, I, is to be inserted, said hook having the shape shown in Fig. 1.

Near the outer ends of the arms H H are pivoted the connecting-bars K K, which extend toward the cross-head G, and are pivoted to a sliding cross-head, L, held within the rods f, said rods passing through holes i at the four corners of the said cross-head L.

The arms H H, the connecting-bars K K, and the sliding cross-head L, together with the hooks I I, form the movably-mounted hooks, which move in a reciprocating manner when the portions I I of the movably-mounted hooks are thrown outwardly from the inclosing-case into position for catching the fish, and when the same portions are again moved inwardly into the inclosing-case to prevent any portion of the movably-mounted hooks from catching the vegetable growth or other obstructions that may be in the waters through which the fish-hook may be trolled. The cross-head L has a tail-rod, l, which passes through a hole, f', in the bracket F, and surrounding this rod and between the bracket and the sliding cross-head is a spiral spring, l'.

At the bracket end of one pair of rods, f f, and at a right angle to a plane of the hook-arms H H, is fastened a plate, M, having ears m m, in which is pivoted a tripping-detent, N, the hooked end n of which projects toward the head B, and has the catch n' on the under side. The tail $n^2$ of the tripping-detent N projects in the opposite direction. Under this detent and to the plate M is fastened one end, o, of a spring, O, and the free end o' of which bears against the under side of the tail $n^2$, so as to tend to keep the catch n' down. The relation of this catch and the sliding cross-head L is such that when the cross-head is moved toward the bracket F the catch will engage the top of the cross-head, as shown in Fig. 2.

To the side of the stationary cross-head G, away from the detent N, is pivoted the locking-detent P, having the head p and a series of catches, p'. To a plate, Q, secured to the rods f f, is fastened a spring, q, which bears against the locking-detent P and forces it toward the rods f, as shown in Fig. 2, and thus keeps the series of catches p' in position to engage with the movably-mounted hooks, so as to positively lock said hooks from being moved backwardly or inwardly toward the interior of the inclosing-case whenever the part L of the movably-mounted hooks is brought in contact or engagement with any one of the series of catches p' until the catches are moved out of engagement with part L by means of pressure on the head p of the locking-detent P.

Extending from the cross-head G to the point b of the head B is a tube, R, through which loosely passes a rod, S, having a head, s, to the side of the cross-head G, away from the head B. In use the arms H are folded in toward the middle line of the inclosing-case, as shown in Fig. 3, the dotted lines indicating the position of the inclosing-case. This brings the hooks I entirely within the case and out of sight. As the arms H are pressed inward, the cross-head L is drawn toward the bracket F, compressing the spring l', and the parts are thus held by the catch n', engaging the edge of the cross-head L, as shown in Fig. 2.

The fish-hook is secured by the rod S to the line. As it is trolled or drawn through the water, the blades E cause it to turn freely, (the same as is the case with spoons and other artificial bait in ordinary trolling-hooks,) the inclosing-case swiveling on the rod S. As soon as the fish takes the artificial bait, (the inclosing-case,) the pressure of his mouth on the inclosing-case causes the lid D to yield inwardly, bearing on the tail of the tripping-detent N against the spring o', when the catch n' is released from the cross-head L, and the freed spring l' forces the cross-head back, throwing out the arms H and the hooks I, the latter catching into the jaws of the fish. As the cross-head L flies back, it is caught by the locking-detent P, and is held against any pull of the fish by the spring q binding the locking-detent against the cross-head. The series of catches p' prevent any dislodgment, for if the struggles of the fish should jerk the cross-head away from one catch it is certain to be caught by one of the others; and, again, if the mouth of the fish should prevent the hook or hooks from being thrown outwardly to the limit of their movement, the series of catches m provide means for locking the hook or hooks against being forced backwardly by any movements of the fish in its endeavors to free itself from the hook or hooks, and if in such efforts the fish should permit the hook or hooks to move or be thrown outwardly still farther the next catch or locking-point on the detent P would serve to lock the hook or hooks in this advanced position, and so on until the hook or hooks reach their utmost limit of movement. This outward movement of the hook or hooks tends to extend and hold open the mouth of the fish, and thus more quickly end its struggles. The cross-head L is released from the locking-detent by pushing on the head p, which can be done through a hole, $p^2$, in the inclosing-case.

In Fig. 4 the inclosing-case is shown in the shape of a fish, the flukes of the tail performing the same function as the blades on the head B, and being the equivalent of such blades.

It will be apparent to a mechanic that the shape and construction of the inclosing-case can vary materially from that shown in the drawings, and yet have it perform the functions required of it in my invention, said function being that of inclosing the hooks or hook, and at the same time of readily yielding upon being seized by a fish, so as to operate a tripping-detent, and thereby release the said portion of the hook or hooks; and, also, that the shape and construction of the other parts can be varied from what they are shown in the drawings, and yet have them perform substantially the same work in the same way that they do in their present shape and construction, and I therefore do not wish to confine myself to the exact form, construction, and location of the several parts; but

What I claim as new, and desire to secure by Letters Patent, is—

1. The combination, substantially as set forth, of a yielding inclosing-case, a frame or support within said case, one or more hooks movably mounted in said frame or support, a hook-actuating spring, and a tripping-detent arranged between the hook or hooks and the yielding inclosing-case, whereby the hook or hooks are held within the inclosing-case while drawn through the water, and are thrown out from said case whenever the case is caused to yield by the bite of the fish upon it, and thus move and release the tripping-detent.

2. The combination, substantially as set forth, of a case or support, one or more hooks movably mounted in said case or support, and a positive locking-detent located within the same, arranged to engage with some movably-mounted portion of the hook-supporting frame, or with the hook or hooks, when the hook or hooks are thrown outwardly from said case or support, whereby, whenever the hook or hooks are thrown outwardly or are being thrown outwardly, the hook or hooks are positively locked in such outward position and positively prevented from being moved inwardly until the locking-detent is unlocked or released.

3. The combination, substantially as set forth, of a yielding inclosing-case, one or more hooks movably mounted in said inclosing-case, a hook-actuating spring, a tripping-detent arranged between the hook or hooks and the yielding inclosing-case, and a positive locking-detent located within the same, arranged to engage with some movably-mounted portion of the hook-supporting frame, or with the hook or hooks, when the hook or hooks are thrown out of the inclosing-case, whereby the hook or hooks are held within the inclosing-case when being drawn through the water, and are thrown from said case whenever the case is caused to yield by the bite of the fish upon it, and thus move and release the tripping-detent, and the locking-detent is caused to engage with the movably-mounted hook-supporting frame, or with the hook or hooks, and positively lock the hook or hooks against being moved backwardly into the inclosing-case until the locking-detent is unlocked or released.

4. The combination, substantially as set forth, of a case or support, one or more hooks movably mounted in said case or support, and a positive locking-detent located within the same arranged to engage with some movably-mounted portion of the hook-supporting frame, or with the hook or hooks, when the hook or hooks are thrown outwardly, or are being thrown outwardly, from the said case or support, and the said locking-detent being provided with two or more locking points or catches, whereby the hook or hooks, when thrown outwardly from the case or support for a distance less than the entire distance or range the said hook or hooks are capable of being thrown out, will be positively locked against being moved backwardly, but are at the same time free to move outwardly to a still greater distance and be again positively locked against being moved backwardly or inwardly until the locking-detent is unlocked or released.

5. The combination, substantially as set forth, of an inclosing-case provided with a hinged part or lid, a frame or support mounted in said inclosing-case, a pair of hooks, I, movably mounted in said frame or support and provided with the arms H and connecting-bars K, rods $f$, having mounted thereon sliding cross-head L, the tripping-detent N, arranged to engage with the hinged lid of the inclosing-case and sliding cross-head L, and the locking-detent P, arranged to engage with the sliding cross-head L, for the purposes described.

WILLIAM F. BREWSTER.

Witnesses:
LOUIS LAFRANCE,
HENRY T. GRAY.